United States Patent
Zhou et al.

(10) Patent No.: US 8,611,703 B2
(45) Date of Patent: Dec. 17, 2013

(54) TEMPERATURE SENSOR USING AN OPTICAL FIBER

(75) Inventors: Bai Zhou, Brossard (CA); Sébastien Miville, Saint-Eustache (CA); André R Vincelette, Deux-Montagnes (CA)

(73) Assignee: Lxdata Inc., St-Laurent, Québec (CA)

( * ) Notice: Subject to any disclaimer, the term of this patent is extended or adjusted under 35 U.S.C. 154(b) by 0 days.

(21) Appl. No.: 13/419,966

(22) Filed: Mar. 14, 2012

(65) Prior Publication Data

US 2012/0170615 A1    Jul. 5, 2012

Related U.S. Application Data

(63) Continuation of application No. 13/342,499, filed on Jan. 3, 2012, now Pat. No. 8,335,406, which is a continuation of application No. 12/527,906, filed on Oct. 24, 2008, now abandoned.

(60) Provisional application No. 60/986,766, filed on Nov. 9, 2007.

(51) Int. Cl.
    *G02B 6/00* (2006.01)
    *G01K 11/00* (2006.01)

(52) U.S. Cl.
    USPC ............................... 385/12; 385/13; 374/161

(58) Field of Classification Search
    USPC ...................................... 385/12, 13; 374/161
    See application file for complete search history.

(56) References Cited

U.S. PATENT DOCUMENTS

| | | |
|---|---|---|
| 3,791,217 A | 2/1974 | Stout et al. |
| 4,078,853 A | 3/1978 | Kempf et al. |
| 4,515,435 A | 5/1985 | Anderson |
| 4,552,432 A | 11/1985 | Anderson et al. |
| 4,687,294 A | 8/1987 | Angeles |
| 4,702,554 A | 10/1987 | Takahashi et al. |
| 4,730,894 A | 3/1988 | Arroyo |
| 4,765,712 A | 8/1988 | Bohannon, Jr. et al. |
| 4,826,278 A | 5/1989 | Gartside, III et al. |
| 4,844,575 A | 7/1989 | Kinard et al. |
| 4,881,795 A | 11/1989 | Cooper |
| 4,960,318 A | 10/1990 | Nilsson et al. |
| 5,082,348 A | 1/1992 | Gartside, III |
| 5,092,680 A | 3/1992 | Kobayashi et al. |
| 5,109,457 A | 4/1992 | Panuska et al. |

(Continued)

FOREIGN PATENT DOCUMENTS

CA    2288957    7/1998

OTHER PUBLICATIONS

Office Action issued Nov. 12, 2009 in U.S. Appl. No. 12/257,906; 12 pages.

(Continued)

*Primary Examiner* — Ryan Lepisto
*Assistant Examiner* — Jerry Blevins

(57) ABSTRACT

A temperature sensor that has an elongated sensing element having a length of at least 10 m, measured at a temperature of 20° C. The elongated sensing element includes an elongated jacket and an optical fiber mounted in the jacket and having an EFL of at least 0.35%, wherein the elongated sensing element has an average temperature error of less than 2° C.

76 Claims, 2 Drawing Sheets

(56) References Cited

U.S. PATENT DOCUMENTS

| | | | |
|---|---|---|---|
| 5,125,063 A | 6/1992 | Panuska et al. | |
| 5,201,020 A | 4/1993 | Kannabiran | |
| 5,237,635 A | 8/1993 | Lai | |
| 5,318,215 A * | 6/1994 | Toya et al. | 228/148 |
| 5,574,816 A | 11/1996 | Yang et al. | |
| 5,611,012 A | 3/1997 | Kuchenbecker | |
| 5,730,527 A * | 3/1998 | Takayama et al. | 374/131 |
| 5,764,839 A | 6/1998 | Igl et al. | |
| 5,838,864 A | 11/1998 | Patel et al. | |
| 5,892,860 A | 4/1999 | Maron et al. | |
| 5,911,023 A | 6/1999 | Risch et al. | |
| 6,271,766 B1 * | 8/2001 | Didden et al. | 340/853.1 |
| 6,324,324 B1 | 11/2001 | Dixon et al. | |
| 6,334,015 B2 | 12/2001 | Jamet | |
| 6,487,345 B1 | 11/2002 | Dixon et al. | |
| 6,496,625 B1 | 12/2002 | Falkowich et al. | |
| 6,621,965 B2 | 9/2003 | Seddon et al. | |
| 6,690,866 B2 | 2/2004 | Bonja et al. | |
| 6,714,713 B2 | 3/2004 | Lanier et al. | |
| 6,785,450 B2 | 8/2004 | Wagman et al. | |
| 6,801,695 B2 | 10/2004 | Lanier et al. | |
| 6,801,696 B2 | 10/2004 | Davis et al. | |
| 6,822,218 B2 | 11/2004 | Helmig et al. | |
| 7,269,319 B2 | 9/2007 | Zimmel | |
| 2004/0213529 A1 * | 10/2004 | Dowd et al. | 385/109 |
| 2007/0075225 A1 * | 4/2007 | Xia et al. | 250/227.14 |
| 2007/0229816 A1 | 10/2007 | Chen et al. | |
| 2009/0210168 A1 * | 8/2009 | Vincelette et al. | 702/23 |

OTHER PUBLICATIONS

Office Action issued May 14, 2010 in U.S. Appl. No. 12/257,906; 10 pages.

Office Action issued Jul. 1, 2011 in U.S. Appl. No. 12/257,906; 9 pages.

Office Action issued Apr. 10, 2012 in connection with U.S. Appl. No. 13/342,499; 11 pages.

* cited by examiner

TEMPERATURE SENSOR USING AN OPTICAL FIBER

CROSS-REFERENCE TO RELATED APPLICATION

This application is a continuation application of U.S. patent application Ser. No. 13/342,499, filed Jan. 30, 2012, which application is a continuation application of U.S. patent application Ser. No. 12/257,906, filed Oct. 24, 2008, which application claims priority to U.S. Provisional Application 60/986,766, filed Nov. 9, 2007 by Bai Zhou, et al., the entire contents of which are hereby incorporated by reference in their entirety.

FIELD OF THE INVENTION

The invention relates to temperature sensing, in particular to a temperature sensor that can measure temperatures by using optical properties of an optical fiber. The invention finds applications in the mining, gas and oil exploration/production industry, in particular the Steam Assisted Gravity Drainage (SAGD) and other heated oil wells or pipelines, serpentine or path probes in various chemical or physical industrial processes, Electric Submersible Pumps (ESP) used for oil recovery or other applications, transformers, heat exchangers, boilers, separation unitary processors, reactors, heat distribution networks, skin probes, thermo-cartography applications, thermo-alarm networks and thermo-aging monitoring applications, among others.

BACKGROUND OF THE INVENTION

The gas and oil exploration or production processes, in particular the SAGD processes often require a precise knowledge of the temperatures that exist in an oil well. In light of the extremely flammable nature of the environment existing in a gas/oil well, optical fibers are used to provide temperature measurements. Typically, an optical fiber based temperature sensor has an optical fiber that establishes an optical path. Gratings are formed at spaced apart intervals along that path. When the optical fiber undergoes expansion or contraction resulting from temperature changes, the optical properties of the gratings are altered. The optical properties can be measured by sending in the optical fiber an interrogation signal and then reading the responses of the individual gratings. A temperature measurement can be derived on the basis of those responses.

A challenge in this type of measurement setups is to lay the optical fiber in the well in a way to minimize any tension or bending strains. Since a tension will have the same effect on a grating as temperature does, namely alter the optical properties of the grating, any artificial tension that is not due to temperature will induce an error in the temperature measurement.

Accordingly, there is a need in the industry to develop new sensors for temperature measurements that use optical fibers and that are protected against deleterious effects of tension/bending strains that may arise during installation of the sensor or during use thereof.

SUMMARY OF THE INVENTION

As embodied and broadly described herein, the invention provides a temperature sensor. The temperature sensor comprises an elongated sensing element having a length of at least 10 m, measured at a temperature of 20° C. The elongated sensing element includes an elongated jacket and an optical fiber mounted in the jacket and having an EFL of at least 0.35%. The elongated sensing element has an average temperature error of less than 2° C.

As embodied and broadly described herein, the invention also provides a temperature measurement system. The temperature measurement system comprises an elongated sensing element having a length of at least 10 m, measured at a temperature of 20° C. The elongated sensing element includes an elongated jacket and an optical fiber mounted in the jacket and having an EFL of at least 0.35%. The elongated sensing element has an average temperature error of less than 2° C. The optical fiber defines an optical path for conveying an optical signal, the optical path manifesting an interaction with the optical signal, the interaction producing a measurable response, the response conveying information about temperature to which the optical fiber is exposed. The temperature measurement system also comprises a measurement component coupled to the optical fiber to sense the response and for deriving from the response information on the temperature to which the optical fiber is exposed.

As embodied and broadly described herein, the invention also provides a temperature sensor. The temperature sensor comprises an elongated sensing element having a length of at least 10 m, measured at a temperature of 20° C. The elongated sensing element includes an elongated jacket and an optical fiber mounted in the jacket and having an EFL of at least 0.35%. The elongated sensing element has an S value of at least about 1 mm2 per percent of EFL.

These and other aspects of the invention will become apparent to those of ordinary skill in the art upon review of the following description of embodiments of the invention in conjunction with the accompanying drawings.

BRIEF DESCRIPTION OF THE DRAWINGS

A detailed description of examples of implementation of the present invention is provided hereinbelow with reference to the following drawings, in which.

Figure 1:
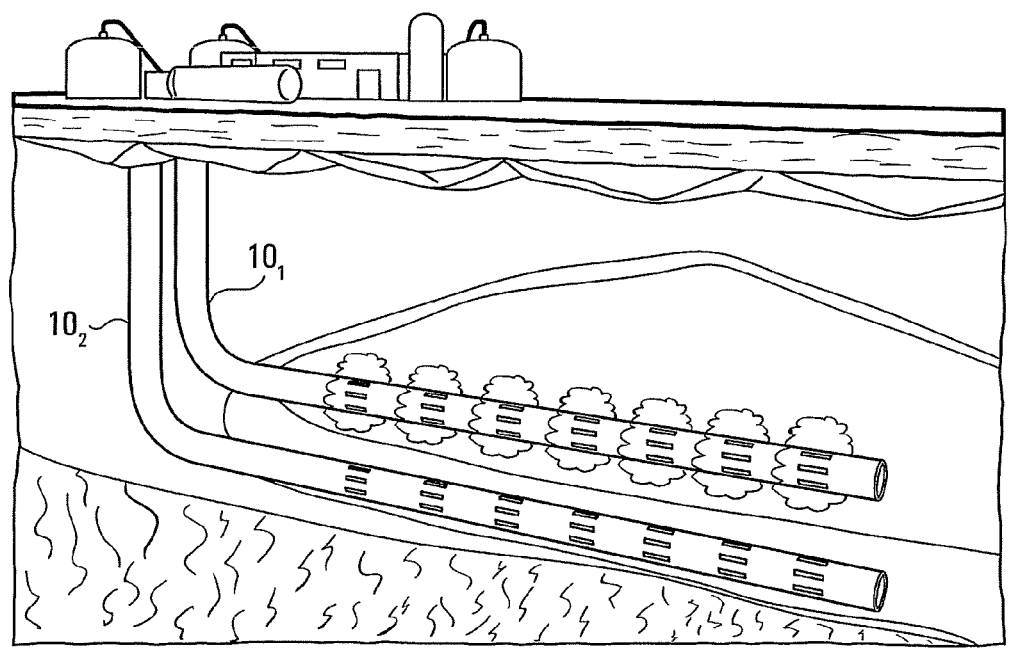
FIG. 1 is a schematical representation of a well drilled during an oil/gas exploration/production operation in which a temperature sensor constructed according to a non-limiting example of implementation of the invention can be used.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

A specific example of implementation will now be provided. This example is made in the context of a Steam Assisted Gravity Drainage (SAGD) production facility. However, it should be clearly understood that the present invention is not limited to this application only and can be used in many other different industries.

FIG. 1 is a schematic illustration of a SAGD oil production facility. The SAGD process is a thermal heavy oil recovery process. Wells 101 and 102 are drilled in the ground in pairs. The wells are horizontally drilled. The upper well 101 in a pair is the injection well while the lower well 102 in a pair is the production well.

The oil recovery process begins by injecting steam in both wells 101 and 102 until the bitumen in the area surrounding the well pair is heated enough to flow to the bottom production well 102. Steam circulation continues in the injection well 101 causing the fluid bitumen to flow to the production well 102 by gravity. The liquefied bitumen is recovered from the production well 101 by using any appropriate method such as by a pump.

Figure 2:
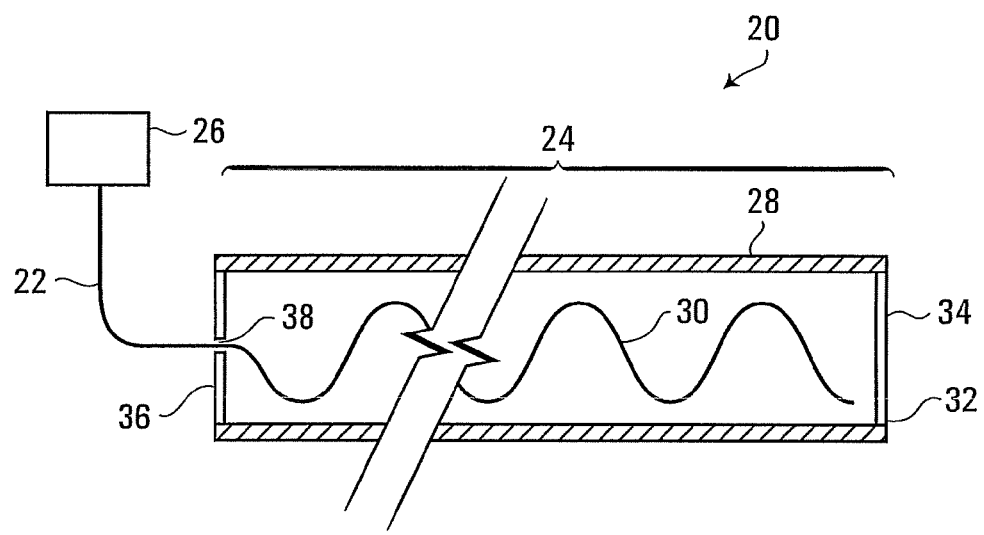
FIG. 2 is an enlarged partial longitudinal cross-sectional view of the temperature sensor shown in FIG. 1.

The SAGD process requires monitoring of the temperature in the well pairs. To provide such temperature measurements, a temperature sensor 20, as shown in FIG. 2, can be used. The temperature sensor 20 is based on an optical fiber and can provide measurements over long spans. Specifically, the temperature sensor 20 has a sensing unit 24 from which extends an optical fiber length 22 leading to a measurement unit 26. The sensing unit 24 is the portion of the temperature sensor 20 that picks up temperature information. It should be noted that the temperature sensor 20 is designed to provide temperature information over significant spans allowing measuring the temperature over significant distances. The length of the span over which the temperature is measured depends on the length of the sensing unit 24.

In this specific example of implementation, the sensing element 24 can be inserted in the production well 102 or the injection well 101. In other examples, the sensing element 24 can be inserted in the production well 102 and another sensing element similar to the sensing element 24 can be inserted in the injection well 101. The sensing element 24 preferably should be long enough to run along a substantial portion of the well length, say at least 50%, preferably 75% and most preferably at least 90% of the well length. The sensing element 24 can have a length of at least about 10 m. For typical SAGD applications, the sensing element 24 would be in the order of 1 km and even more. For other applications, the sensing element 24 can be shorter. Generally, sensing element lengths of about 10 m, 100 m, 500 m or 1 km and more are possible.

The sensing unit 24 includes a jacket 28 that extends the full length of the sensing unit 24. The jacket 28 is provided to protect the optical fiber 30 placed in the jacket 28. The jacket 28 should be flexible enough to allow the sensing unit 24 to bend during installation and at the same time it should have a sufficient crush resistance to prevent damage to the optical fiber 30 that may arise as a result of interaction with adjoining components or pressure arising within the well. A wide range of materials can be selected for the manufacture of the jacket 28. Metallic materials, such as stainless steel, are a good choice since they readily offer the flexibility and crush resistance criteria. The choice of the specific metallic material will be governed by the specific conditions that exist in the environment in which the sensing unit 24 is to be placed. In corrosive environments, stainless steel is usually a good choice. Polymeric, ceramic or composite materials can also be used provided that they have the requisite properties.

A wide range of different techniques can be used to make the jacket 28. When the jacket is made of metallic material it can be manufactured as a tube and the optical fiber 30 inserted through the tube. This would work for very short sensing units 24. Alternatively, the jacket 28 can be formed in a continuous process around the optical fiber 30. More specifically, the jacket is made from a strip of metallic material supplied from a coil. The optical fiber 30 is run parallel to the strip while the strip is fed to a forming station that uses a suitable die to progressively bend the strip into a tube around the optical fiber 30. In this fashion, the longitudinal edges of the strip are brought in a face to face relationship, the resulting tube enclosing the optical fiber 30. To seal the tube the longitudinal edges are welded.

Since this is a continuous process, a sensing unit 24 of any length can be made as long as a metallic material strip and an optical fiber 30 of the proper length dimensions can be provided.

Once the tube portion of the jacket 28 is formed around the optical fiber 30, the end portion 32 of the jacket 28 can be closed. A suitable cap 34 can be welded or inserted within or outside the jacket 28. A similar cap 36 is also provided at the opposite end of the jacket 28, with the exception that the cap 36 has a passageway 38 through which the optical fiber 30 can pass.

Alternatively, the jacket 28 may be left open at the ends.

When the jacket 28 is made from polymeric or ceramic materials it can be extruded in the form of a tube directly around the optical fiber 30. In this case the polymeric or ceramic material is extruded through a tube-shaped die while the optical fiber 30 is fed through an opening in the die.

In the case of composite materials, fibers may be wrapped around the optical fiber 30, again as a continuous process to build up a tube that will ultimately form the jacket 28.

The optical fiber 30 placed in the jacket 28 provides temperature sensing over the length of the optical fiber 30. The temperature sensing may be made at discrete areas along the optical fiber 30. In this fashion, the sensing unit 24 generates temperature information at various discrete locations along its length. The spacing between those locations can be varied depending on the intended application. In a specific and non-limiting example of implementation, the optical fiber 30 includes discrete sensors at each measurement location which can be interrogated independently of one another. One possible example of a discrete sensor is a grating, such as a Fiber Bragg grating (FBG).

The sensing mechanism most often used in FBGs arises from the fact that the reflection wavelength for the forward propagating core mode varies linearly with temperature and strain. Since the wavelength can be measured with an accuracy of 10 μm relatively easily near 1550 nm, this represents a relative resolution of about 6 ppm. A variant of the same concept uses so-called Long Period Gratings (LPG) where coupling occurs between the forward propagating core mode and forward propagating cladding modes. In this case, the sensitivity of the resonance wavelength to perturbations can be greatly enhanced for some of the cladding modes.

Another possible example of a discrete sensing unit is a Fabri-Perot cavity.

In a possible variant, the sensing of the strain induced in the optical fiber 30 as a result of temperature changes is made by measuring the back scattered light produced as the optical interrogation signal propagates along the optical fiber 30. Without intent of being bound by any particular theory, scattering in general and back scattering in particular arises as a result of inhomogeneities in the refractive index in the optical path or due to acoustic waves known as phonons. Different components of the back-scattered light can be identified, such as Raleigh, Raman and Brillouin scattering. The Brillouin scattering induces a Doppler frequency shift of the scattered light. This is usually referred to as the spontaneous Brillouin scattering.

For instance an interrogation signal in the form of a pulse will propagate along the optical fiber 30 and as it propagates it will interact with the optical path. This interaction produces a measurable back scattering response. The back scattering response propagates in an opposite direction with relation to the direction of travel of the optical interrogation pulse. Generally the response is downshifted in frequency relative to the frequency of the optical interrogation pulse which allows distinguishing the response from the optical interrogation pulse itself.

When the optical fiber 30 is at the same temperature along its length, the back scattering phenomenon is homogeneous along the length of the optical fiber 30. In other words, as the optical interrogation pulse travels along the optical fiber, the interaction with the optical path remains the same. Accordingly, the frequency shift between the response and the optical interrogation signal does not change.

In the case when strain is induced in the optical fiber 30, which can arise if the ambient temperature changes, the interaction will also change. The temperature change produces alterations in the optical path and those alterations affect the interaction between the optical path and the optical interrogation pulse. Such interaction changes manifest themselves as frequency shifts of the response. Accordingly the frequency shift between the response and the frequency of the optical interrogation pulse constitutes an indicator of the temperature change in the optical fiber 30.

It should be noted that the interaction between the optical interrogation signal and the optical path occurs in a continuous fashion as the optical interrogation signal propagates along the optical fiber 30. This is to be distinguished from the previous examples where the interaction is of discrete nature and occurs only at specific locations in the optical fiber where sensors, such as gratings are placed. Accordingly, when the optical interrogation signal propagates along the optical fiber 30 it produces a response only when it encounters a grating. No response is produced between gratings.

By using a continuous interaction system of the type described earlier there is no necessity to provide any sensors in the optical fiber 12. In fact, the optical fiber 12 is a standard optical fiber without any modifications or changes required.

The measuring unit 26 is provided to produce the interrogation pulse, read the response produced by the optical fiber 30 and then derive from those responses temperature information. The measuring unit 26 includes several components which in practice will be controlled via a computer.

The structure and functionality of the measuring unit 26 will obviously be dependent on the type of sensing mechanism used by the sensing unit 24. When discrete sensors are used, the interrogation signal can be designed with a wavelength to encompass the entire reflection wavelength range of the gratings array in the optical fiber 30. Accordingly, a single interrogation signal will prompt all the gratings to respond. The responses can be distinguished from one another on the basis of their wavelength. Since the position of each grating in the optical fiber 30 is known, then it is possible to derive on the basis of the reflection wavelength shift the temperature in the area where the grating is located. Since each grating provides a temperature measurement, the collection of temperature measurements can be used to create a temperature profile along the sensing unit 24.

In the case of backscattering, the measuring unit 26 includes an interrogation source that generates the optical interrogation signal. The interrogation source can be a laser to deliver an optical interrogation signal in the form of a pulse. The duration, intensity and wavelength (frequency) of the pulse can be determined according to the intended application.

A response sensor is connected to the optical fiber 30 to sense the response produced by the optical interrogation signal. The response sensor detects the presence of the response and also determines the wavelength (frequency) of the response.

A processing component receives the wavelength information from the response sensor. Specifically, the processing component includes a timing unit. The timing unit drives the interrogation source. When the interrogation source is triggered by the timing unit an optical interrogation pulse is injected into the optical fiber 30. At the same time a high precision timing circuit is triggered to count time. Since the travel speed of the optical interrogation pulse in the optical fiber 30 is known and the speed of travel of the response is also known, it is possible to determine, on the basis of the time span between the trigger of the optical interrogation pulse and the reading of the response the area of the optical path (the distance from the extremity of the optical fiber 30 at which the optical interrogation pulse in injected and where the response is read) that has produced the response.

For instance if it is desired to read the response produced by the area of the optical fiber 30 that is 500 m from the extremity of the optical fiber 30, the timing unit counts time that corresponds to the time necessary for the optical interrogation pulse to travel 500 m down the optical fiber 30, plus the time it takes the response to travel back the 500 m distance to the extremity of the optical fiber 30. As indicated earlier, since the speed of the travel of the optical interrogation pulse and of the response are known, it is possible to compute the duration of the time interval necessary to get a reading from a desired location on the optical fiber 30.

Once the time duration computed by the timing unit has elapsed, the timing unit signals the response sensor to take a reading of the wavelength of the response. The wavelength information captured by the response sensor at that particular time indicates the intensity of the temperature induced strain acting at the location of the optical fiber 30 where the measurement is being read. The position of that location, in terms of distance measured along the optical fiber 30 is determined on the basis of the time interval between the triggering of the optical interrogation pulse and the wavelength reading.

The same operation can be repeated to measure the strain induced on the optical fiber 30 but at a different position, by changing the time interval. This can be done by triggering a new optical interrogation pulse and extending the time interval in order to obtain a reading further down the optical fiber 30. The different data points obtained in this fashion can be used to create a temperature profile for the optical fiber 30.

The resolution of the temperature profile, in other words, the minimal distance between measurement points along the optical fiber 30, depends largely on the accuracy of the timing unit. With a highly accurate timing unit, of a type that is commercially available, it is possible to read the strains at steps as low as 25 cm.

In a possible variant, a pump source is used that allows creating a Stimulated Brillouin Scattering (SBS) interaction. The pump source produces a laser beam that is introduced into the optical fiber 30. If the intensity of the beam is sufficiently high its electric field will generate acoustic vibrations in the optical path via electrostriction. This can generate Brillouin scattering that can be effectively amplified by injecting in the optical fiber 30 an optical interrogation pulse. The SBS is advantageous in that it produces a stronger response that is easier to pick up and process.

Figure 3:
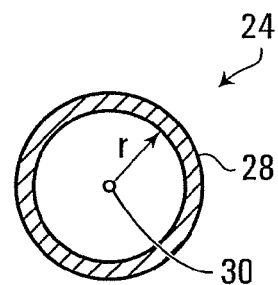
FIG. 3 is a cross-sectional view of the temperature sensor shown in FIG. 2.

With specific reference to FIGS. 2 and 3, the optical fiber 30 is laid loosely in the jacket 28 such as to allow the optical fiber 30 and the jacket 28 to expand or contract, as a result of temperature variations, independently of one another. In the examples described earlier, the jacket 28 is made of materials that have a Coefficient of Thermal Expansion (CTE) that is greater than the CTE of the optical fiber 30. As a result, the jacket 28 expands more than the optical fiber 30 when the temperature in the area in which the sensing unit 24 is placed increases. For example, the CTE ratio (CTEjacket/CTEfiber) is of at least about 1.0001, preferably of at least about 10 and most preferably of at least about 20.

For instance, in the case of a sensing unit 24 having a length of 1.5 km and with a jacket made of stainless steel, the jacket will expand by about 3 m to 4 m, when the sensing unit 24 is exposed to temperatures in the range from 200° C. to 250° C., by comparison to the jacket length at the ambient temperature (20° C.). At the same temperature shift, the optical fiber 30 would expand by about 0.1 m to 0.15 m. Note that the temperature range of about 200° C. to about 250° C. typically corresponds to the temperatures encountered in a well in a SAGD operation.

To accommodate this difference, Excess Fiber Length (EFL) is provided in the jacket 28. This means that at the temperature at which the EFL is measured, which typically would be the ambient temperature, the length of the optical fiber 30 will exceed the length of the jacket 28. The degree of EFL is such that once the jacket 28 is within its operational temperature range, in other words the temperature range in which the temperature measurements are to be made, the length of the optical fiber 30 will be about the same as the length of the jacket 28. The amount of EFL to be built into the sensing unit 24 depends largely on the intended application. Applications where high temperatures are to be measured would require more EFL than those where lower temperatures are measured.

The amount of EFL built into the sensing unit 24 can be expressed in terms of percentage. Specifically, it can be computed by $$\frac{(F_l - J_l) \times 100\%}{F_l}$$

at an ambient temperature which for the purpose of this specification is defined to be 20° C. In the above equation, Fl is the total optical fiber length while Jl is the total jacket 28 length. For instance, for the temperature sensor 20 considered in this example, the EFL may be of at least about 0.35% (0.0035), preferably at least about 0.50%, and most preferably at least about 0.70%.

The desired amount of EFL is normally provided at the manufacturing stage by stretching the jacket 28 while the optical fiber 30 is being placed into it. Specifically, this is performed by the mechanism which forms the metallic strip as a tube around the optical fiber 30. One possibility is to feed the metallic strip between series of spaced apart rollers that turn at slightly different speed such as to create a stretch into the strip. Once the tube is formed, the stretch pressure is released and the tube then resiliently shrinks, thus causing the EFL to arise.

Since the sensing unit 24 is intended to operate within a range of temperatures where accurate temperature measurements are expected to be made, the jacket 28 and the optical fiber 30 will experience a certain degree of relative motion as the temperature outside the sensing unit 24 varies within that range. For instance consider the situation where the outside temperature (the temperature outside the sensing unit 24) is near the lower end of the operational temperature range. When the outside temperature increases the jacket 28 will elongate more than the optical fiber 30 and this additional elongation will translate as a relative sliding movement between the two components. If the temperature now decreases toward the starting point, the reverse movement will occur.

The relationship between the jacket 28 and the optical fiber 30 is such that the movement of both components as a result of temperature changes reduces as much as possible the occurrence of residual stresses on the optical fiber 30. Obviously, such residual stresses are undesirable. If the jacket 28 would be allowed during thermal expansion to drag the optical fiber 30 and somewhat stretch it, the resulting stress in the optical fiber 30 will register as a temperature change, thus causing a measurement error.

To reduce the interaction between the jacket 28 and the optical fiber 30, one possibility is to make the jacket 28 large enough such that the optical fiber 30 virtually free floats inside and both components can move without causing undue stresses on the optical fiber 30. The degree of spacing that should be provided between the optical fiber 30 and the jacket 28 is dependent on the degree of EFL built into the sensing unit 24; the larger the EFL the higher the spacing should be. Therefore the spacing S is defined by $$\frac{A_j}{EFL}$$

where Aj is the cross-sectional area of the jacket 28 and EFL is expressed as a percentage. Aj is assessed by measuring or computing the internal cross-sectional area of the jacket 28 at every meter of the jacket length, at 20° C., and the results are averaged. In the example shown in FIG. 3, where the jacket 28 has a circular cross-sectional shape, the internal radius r of the jacket 28 is used to compute the cross-sectional area by the well known formula $\pi r^2$. Since the cross-sectional area is the same along the entire length of the jacket 28, a single measurement will suffice and there is no need to make multiple measurements.

According to one aspect of the invention, the sensing unit 24 has an S value of at least about 1 mm2 per percent of EFL, preferably of at least about 6.25 mm2 per percent of EFL and most preferably of at least about 10 mm2 per percent of EFL.

Other possibilities to reduce the interaction between the jacket 28 and the optical fiber 30 is to coat the internal surface of the jacket 28 and/or the outside surface of the optical fiber 30 with friction reducing material such as to facilitate the relative sliding movement between the two components. An example of such friction reducing material is polytetrafluoroethylene. Another possibility is to fill the jacket 28 with a suitable liquid to provide lubrication at the contact surfaces between the jacket 28 and the optical fiber 30. Evidently, the choice of the liquid will depend on the operational temperature range. For instance, in the example of an operational temperature range from 200° C. to 250° C., a suitable lubricant working well in that temperature range can be used.

The approaches described above can be used individually or in combination to reduce the jacket 28/optical fiber 30 interaction.

The sensing unit 24 is characterized by a maximal average temperature error D. The average temperature error D for a sensing unit is determined by the following procedure:

A sensing unit is provided and it is laid flat on a table or any other suitable support. The arrangement is such that the sensing unit remains straight and horizontal during the entire testing procedure. The sensing unit has a jacket in which is placed at least one optical fiber running lengthwise of the jacket. The optical fiber has an EFL of at least 0.35% measured at 20° C. The sensing unit that is being tested should have a length of at least 10 m. If the sensing unit is too long and it is not practical to build a test set up to support it straightened and in a horizontal position, then a ten meter sample should be cut or manufactured separately and that sample is tested.

The optical fiber has at least one temperature measuring point per 10 m of length of the sensing unit.

The sensing unit is laid flat and the ambient temperature raised to the minimal temperature of the expected operational temperature range in which the sensing unit would be used in operation. For example, in the example considered previously herein, this temperature is 200° C. Heating of the sensing unit is to be effected uniformly over its length. The sensing unit is left at that temperature for 10 minutes and a temperature reading taken via the optical fiber. At the same time an independent temperature measurement is obtained from a calibrated probe at the point along the length of the sensing unit 24 which corresponds to the location where the temperature is read by the optical fiber 30.

The temperature is raised by 10° C. and the process described earlier is repeated to obtain a temperature measurement from the sensor unit and a corresponding temperature measurement from the calibrated probe. Temperature measurements are thus obtained for every 10° C. interval from the lower end of the operational temperature range (200° C.) up to the upper end of the range, which is 250° C. in this example.

Once the upper end temperature has been reached, the temperature is cycled down, and measurements made, as described earlier at each 10° C. step, until the lower end of the temperature range has been reached.

The measurements provide a set of data point pairs. There is a data point pair associated for each measuring point, for each 10° C. interval and for each cycle (up or down). Each data point pair includes a temperature measurement obtained via the optical fiber and one obtained via the calibrated probe. For instance if there are two measurement locations on the sensing unit 24, say one measurement location at 5 m from one extremity of the sensing unit and another measurement location at 5 m from the other extremity of the sensing unit, and the temperature range is of 200° C. to 250° C., then a total of 24 data point pairs will be obtained. Those break down as follows:

There are 12 point pairs per measurement location.

Per measurement location, there are 6 point pairs, one pair for each 10° C. spread when the temperature is cycled upward (point pairs at 200, 210, 220, 230, 240 and 250° C., respectively).

Per measurement location, there are 6 point pairs, one pair for each 10° C. spread when the temperature is cycled downward (point pairs at 250, 240, 230, 220, 210 and 200° C., respectively).

For each data point pair a temperature error is computed. This is done by subtracting one temperature measurement from the other and then taking the absolute value of the result.

The temperature errors are summed and the result is divided by the number of temperature error values to obtain an average temperature error. The average temperature error is then divided by the length of the sensing unit to obtain the average temperature error per unit length.

According to one aspect of the invention, the maximal average temperature error D is of less than 2° C., preferably of less than 1° C. and most preferably of less than 0.2° C.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A method for measuring a physical parameter at a plurality of spaced apart locations in a subterranean formation where the temperature is in excess of 200 degrees Celsius, the method comprising:
    a. inserting into a well extending into the subterranean formation an elongated sensing element, the elongated sensing element including:
        i. an outer jacket having a coefficient of thermal expansion $CTE_{jacket}$;
        ii. an optical fiber in the jacket defining an optical path through the plurality of locations, the optical fiber having an excess fiber length EFL at 20 degrees Celsius of at least 0.35%, the optical fiber having a coefficient of thermal expansion $CTE_{fiber}$, a ratio $CTE_{jacket}/CTE_{fiber}$ being greater than 1.0;
    b. injecting an optical signal in the optical fiber, the optical fiber producing a measurable response to the optical signal, the measurable response being dependent on" a dimensional change induced in the optical fiber as a result of thermal expansion or contraction of the optical fiber;
    c. processing the measurable response to derive physical parameter information at the plurality of spaced apart locations.

2. A method as defined in claim 1, wherein the optical fiber has a length of at least 100 m.

3. A method as defined in claim 1, wherein the optical fiber has a length of at least 500 m.

4. A method as defined in claim 1, wherein the optical fiber has a length of at least 1 km.

5. A method as defined in claim 1, wherein the excess fiber length EFL at 20 degrees Celsius is at least 0.50%.

6. A method as defined in claim 1, wherein the excess fiber length EFL at 20 degrees Celsius is at least 0.70%.

7. A method as defined in claim 1, wherein the optical path manifesting an interaction with the optical signal, the interaction occurring only at a plurality of discrete areas spaced apart along the optical fiber and corresponding to the plurality of spaced apart locations.

8. A method as defined in claim 1, wherein the optical fiber includes a plurality of spaced apart discrete sensing devices having a temperature dependent response to optical interrogation.

9. A method as defined in claim 8, wherein each discrete sensing device is responsive to a dimensional change imparted to the optical fiber as a result of thermal expansion.

10. A method as defined in claim 9, wherein each discrete sensing device includes a grating.

11. A method as defined in claim 10, wherein the grating includes a Bragg grating.

12. A method as defined in claim 1, wherein the optical path manifesting an interaction with the optical signal, the interaction being continuous along the optical fiber.

13. A method as defined in claim 12, wherein the interaction produces back-scattering.

14. A method as defined in claim 13, including sensing the back-scattering to derive the temperature information.

15. A method as defined in claim 1, wherein the ratio $CTE_{jacket}/CTE_{fiber}$ is at least 10.

16. A method as defined in claim 15, wherein the ratio $CTE_{jacket}/CTE_{fiber}$ is at least 20.

17. A method as defined in claim 1, wherein the jacket is made of metallic material.

18. A method as defined in claim 1, wherein the jacket includes ceramic material.

19. A method as defined in claim 1, wherein the jacket includes a polymeric material.

20. A method as defined in claim 1, wherein the subterranean formation contains oil for extraction to the surface.

21. A method as defined in claim 20, wherein the well is either one of a steam injection well and an oil production well of a steam assisted gravity drainage (SAGD) oil production installation.

22. A method as defined in claim 21, including the step of inserting the elongated sensing element in the steam injection well.

23. A method as defined in claim 21, including the step of inserting the elongated sensing element in the oil production well.

24. A method as defined in claim 1, wherein the jacket has an internal cross-sectional area Aj, the elongated sensing elemen $$\frac{A_j}{EFL}$$

ng a parameter S=of at least 1 mm² per percent of EFL.

25. A method as defined in claim 24, wherein the parameter S is at least 6.25 mm² per percent of EFL.

26. A method as defined in claim 25, wherein the parameter S is at least 10 mm² per percent of EFL.

27. A method as defined in claim 1, wherein the physical parameter is temperature.

28. A method as defined in claim 27, wherein the elongated sensing element has an average temperature error of less than 2 degrees Celsius.

29. A sensor for measuring a physical parameter at a plurality of spaced apart locations in a subterranean formation where the temperature is in excess of 200 degrees Celsius, the sensor having an elongated sensing element for insertion in a well extending into the subterranean formation, the elongated sensing element comprising:
  a. an outer jacket having a coefficient of thermal expansion $CTE_{jacket}$;
  b. an optical fiber in the jacket, the optical fiber having an excess fiber length EFL at 20 degrees Celsius of at least 0.35%, the optical fiber having a coefficient of thermal expansion $CTE_{fiber}$, a ratio $CTE_{jacket}/CTE_{fiber}$ being greater than 1.0, variations in the physical parameter causing localized dimensional changes in the optical fiber at the spaced apart locations, the localized dimensional changes being measurable via an optical signal injected in the optical fiber.

30. A sensor as defined in claim 29, wherein the optical fiber has a length of at least 100 m.

31. A sensor as defined in claim 29, wherein the optical fiber has a length of at least 500 m.

32. A sensor as defined in claim 29, wherein the optical fiber has a length of at least 1 km.

33. A sensor as defined in claim 29, wherein the excess fiber length EFL at 20 degrees Celsius is at least 0.50%.

34. A sensor as defined in claim 29, wherein the excess fiber length EFL at 20 degrees Celsius is at least 0.70%.

35. A sensor as defined in claim 29, wherein the optical path manifesting an interaction with the optical signal, the interaction occurring only at a plurality of discrete areas spaced apart along the optical fiber and corresponding to the plurality of spaced apart locations.

36. A sensor as defined in claim 29, wherein the optical fiber includes a plurality of spaced apart discrete sensing devices having a temperature dependent response to optical interrogation.

37. A sensor as defined in claim 36, wherein each discrete sensing device is responsive to a dimensional change imparted to the optical fiber as a result of thermal expansion.

38. A sensor as defined in claim 37, wherein each discrete sensing device includes a grating.

39. A sensor as defined in claim 38, wherein the grating includes a Bragg grating.

40. A sensor as defined in claim 29, wherein the optical path manifesting an interaction with the optical signal, the interaction being continuous along the optical fiber.

41. A sensor as defined in claim 40, wherein the interaction produces back-scattering.

42. A sensor as defined in claim 41, including sensing the back-scattering to derive the temperature information.

43. A sensor as defined in claim 29, wherein the ratio $CTE_{jacket}/CTE_{fiber}$ is at least 10.

44. A sensor as defined in claim 29, wherein the ratio $CTE_{jacket}/CTE_{fiber}$ is at least 20.

45. A sensor as defined in claim 29, wherein the jacket is made of metallic material.

46. A sensor as defined in claim 29, wherein the jacket includes ceramic material.

47. A sensor as defined in claim 29, wherein the jacket includes a polymeric material.

48. A sensor as defined in claim 29, wherein the jacket has an internal cross-sectional area Aj, the elongated sensing element having a parar $$\frac{A_j}{EFL}$$

S=of at least 1 mm² per percent of EFL.

49. A sensor as defined in claim 48, wherein the parameter S is at least 6.25 mm² per percent of EFL.

50. A sensor as defined in claim 49, wherein the parameter S is at least 10 mm² per percent of EFL.

51. A sensor as defined in claim 29, wherein the physical parameter is temperature.

52. A sensor as defined in claim 51, wherein the elongated sensing element has an average temperature error of less than 2 degrees Celsius.

53. A method for measuring a physical parameter at a plurality of spaced apart locations in a subterranean formation that contains oil for extraction to the surface, where the temperature is in excess of 200 degrees Celsius, the method comprising:
  a. inserting into a well extending into the subterranean formation an elongated sensing element, the elongated sensing element including:
    i. an outer jacket having a coefficient of thermal expansion $CTE_{jacket}$;
    ii. an optical fiber in the jacket defining an optical path through the plurality of locations, the optical fiber having an excess fiber length EFL at 20 degrees Celsius of at least 0.35%, the optical fiber having a coefficient of thermal expansion $CTE_{fiber}$, a ratio $CTE_{jacket}/CTE_{fiber}$ being greater than 1.0;
  b. injecting an optical signal in the optical fiber, the optical fiber producing a measurable response to the optical signal, the measurable response being dependent on" a dimensional change induced in the optical fiber as a result of thermal expansion or contraction of the optical fiber;

c. processing the measurable response to derive physical parameter information at the plurality of spaced apart locations, d. wherein the well is either one of a steam injection well and an oil production well of a steam assisted gravity drainage (SAGD) oil production installation, the method including inserting the elongated sensing element such that it runs at least 50% of the well.

54. A method as defined in claim 53, wherein the optical fiber has a length of at least 100 m.

55. A method as defined in claim 53, wherein the optical fiber has a length of at least 500 m.

56. A method as defined in claim 53, wherein the optical fiber has a length of at least 1 km.

57. A method as defined in claim 53, wherein the excess fiber length EFL at 20 degrees Celsius is at least 0.50%.

58. A method as defined in claim 53, wherein the excess fiber length EFL at 20 degrees Celsius is at least 0.70%.

59. A method as defined in claim 53, wherein the optical path manifesting an interaction with the optical signal, the interaction occurring only at a plurality of discrete areas spaced apart along the optical fiber and corresponding to the plurality of spaced apart locations.

60. A method as defined in claim 53, wherein the optical fiber includes a plurality of spaced apart discrete sensing devices having a temperature dependent response to optical interrogation.

61. A method as defined in claim 60, wherein each discrete sensing device is responsive to a dimensional change imparted to the optical fiber as a result of thermal expansion.

62. A method as defined in claim 60, wherein each discrete sensing device includes a grating.

63. A method as defined in claim 62, wherein the grating includes a Bragg grating.

64. A method as defined in claim 53, wherein the optical path manifesting an interaction with the optical signal, the interaction being continuous along the optical fiber.

65. A method as defined in claim 64, wherein the interaction produces back-scattering.

66. A method as defined in claim 65, including sensing the back-scattering to derive the temperature information.

67. A method as defined in claim 53, wherein the ratio $CTE_{jacket}/CTE_{fiber}$ is at least 10.

68. A method as defined in claim 57, wherein the ratio $CTE_{jacket}/CTE_{fiber}$ is at least 20.

69. A method as defined in claim 53, wherein the jacket is made of metallic material.

70. A method as defined in claim 53, wherein the jacket includes ceramic material.

71. A method as defined in claim 53, wherein the jacket includes a polymeric material.

72. A method as defined in claim 53, wherein the jacket has an internal cross-sectional area Aj, the elongated sensing element having a parameter $$S = \frac{A_j}{EFL}$$

of at least 1 mm² per percent of EFL.

73. A method as defined in claim 72, wherein the parameter S is at least 6.25 mm² per percent of EFL.

74. A method as defined in claim 72, wherein the parameter S is at least 10 mm² per percent of EFL.

75. A method as defined in claim 53, wherein the physical parameter is temperature.

76. A method as defined in claim 75, wherein the elongated sensing element has an average temperature error of less than 2 degrees Celsius.

* * * * *